July 22, 1947.                J. W. SAWYER                2,424,254
                DEVICE FOR DETERMINING COMPASS ERRORS
                    Filed Jan. 27, 1945      3 Sheets-Sheet 2
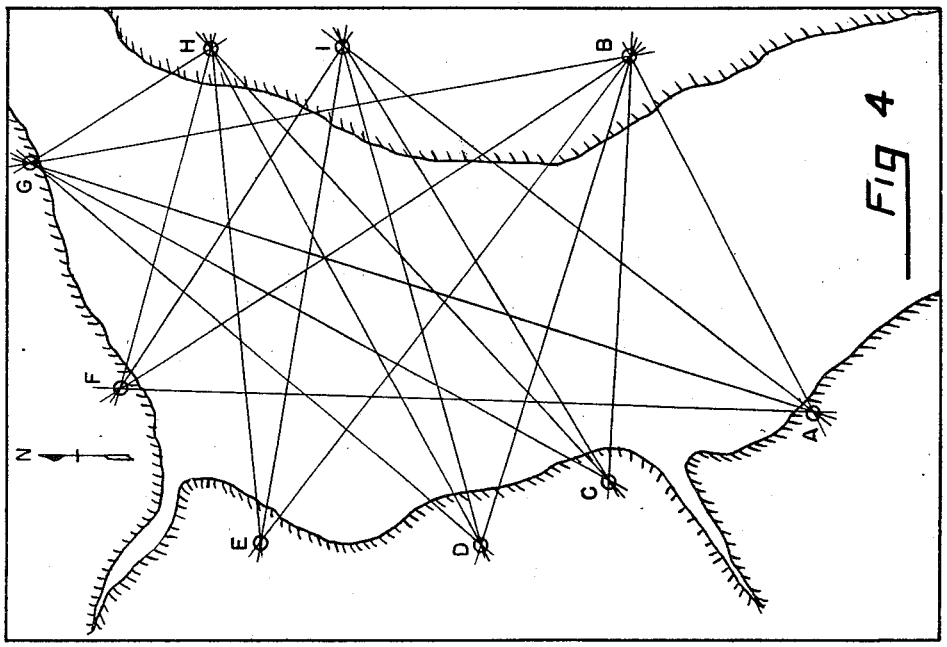
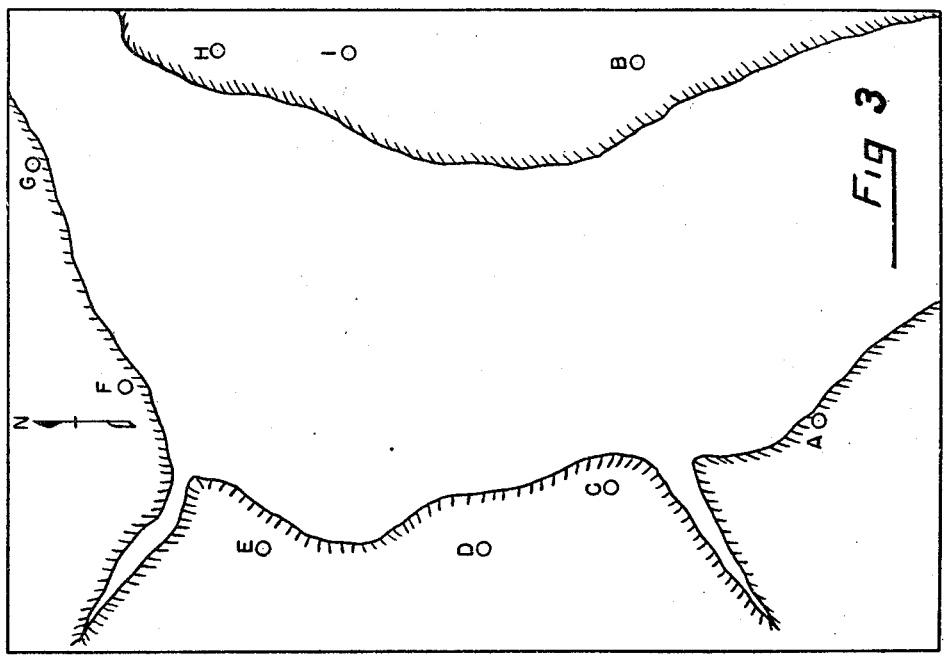
INVENTOR
J.W. SAWYER
BY
ATTORNEY Patented July 22, 1947

2,424,254

UNITED STATES PATENT OFFICE 2,424,254

DEVICE FOR DETERMINING COMPASS ERRORS

John W. Sawyer, United States Navy

Application January 27, 1945, Serial No. 574,939

3 Claims. (Cl. 88—2.6)

(Granted under the act of March 3, 1883, as amended April 30, 1928; 370 O. G. 757)

This invention relates to apparatus adapted to be used by ship's personnel for determining the magnetic and true heading of a vessel and, in particular, relates to a range-mirror unit adapted to be used in combination with a navigating means such as a pelorus or the like for sighting on known objects as monuments, lighthouses, and the like, of which any combination of two form center ranges having known directional bearings.

Heretofore, great difficulties have been encountered in determining the deviation error existing in compass readings in that no means have been provided heretofore whereby sights may be rapidly and accurately taken on known objects after a ship moves into a harbor or channel. The usual procedure in determining the amount of compass error involves swinging ship so that for the various ship headings from zero to 360° the amount of error can be determined. Usually, there are not many ranges available in any one channel so that considerable maneuvering is required in order that those ranges which are available may be utilized. Also, when visibility is poor, the more distant of two monuments or lights establishing a range may not be discernible where the standard pelorus only is utilized, thereby adding to the difficulties.

However, advantage may be taken of center ranges, that is, those ranges established by two monuments or lighthouses on either side of a channel whereby a vessel will cross the line joining the two. Thus, inasmuch as many such center ranges will be available, as opposed to the number of ordinary ranges provided, the ship's heading may be changed as the vessel moves into a relatively wide harbor or channel so that in crossing the various ranges compass deviation may be checked without necessitating maneuvering the ship back and forth across one or two ranges, thus avoiding considerable loss of time and needless laborious effort on the part of the crew. Similarly, in proceeding out of the channel, in the opposite direction, headings of the ship can be readily changed in order to complete the required number of sights. Thus, since a great amount of expense is involved to the owners of a vessel engaged in non-productive effort such as that entailed in the compensation of compasses, it is necessary that the sights be taken quickly and accurately even though the ranges be crossed at a high rate of speed, a requirement which is fulfilled by the invention disclosed herein.

It is one object of this invention, therefore, to provide a means by which sighting may be taken quickly and accurately in determining bearings of objects from a vessel where center ranges are available.

Another object of this invention is to provide an apparatus which may be used in combination with a navigating means such as a compass or pelorus for determining true or magnetic headings of a vessel.

A further object of this invention is to provide a simple device which permits ease of operation for determining from shore bearings the magnetic or true course of a vessel.

These, as well as the various other novel features and advantages of this invention will become apparent from a reading of the specification and accompanying drawings of which:

Fig. 3 illustrates a typical channel or harbor showing a plurality of lights, monuments and the like but of which, no two form a range on shore;

Fig. 4 is a view of the channel shown in Fig. 3 but showing the number of center ranges which may be made available.

Figure 1:
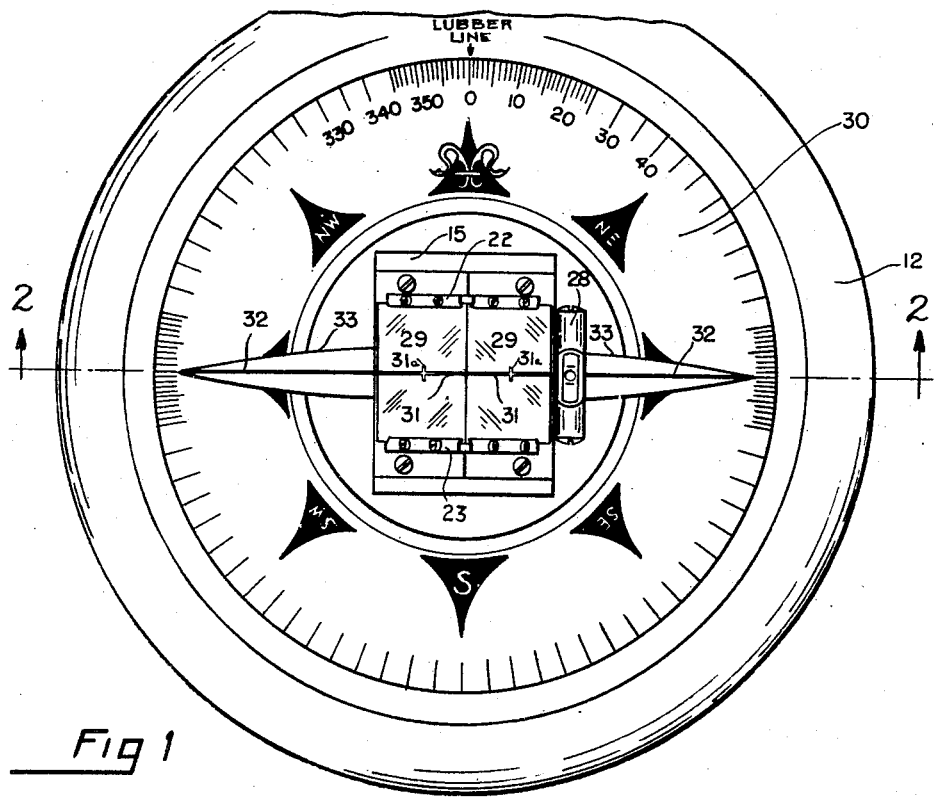
Fig. 1 is a plan view of the range-mirrors in combination with a pelorus.
Figure 2:
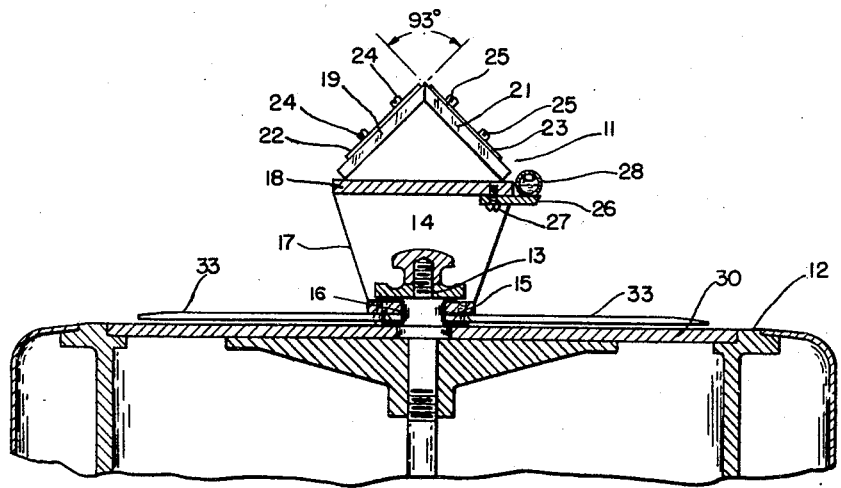
Fig. 2 is an elevation sectional view taken at 2—2 of Fig. 1.
Figure 5:
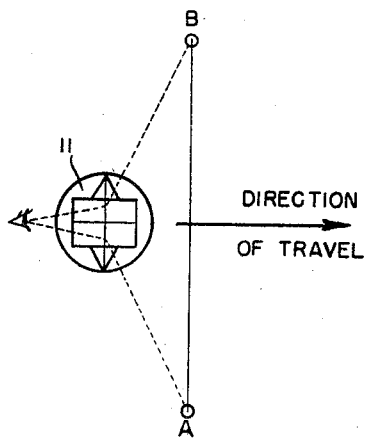
Figs. 5, 6 and 7 indicate the approach, on range and departure positions of the pelorus combination employing the features of this invention.
Figure 6:
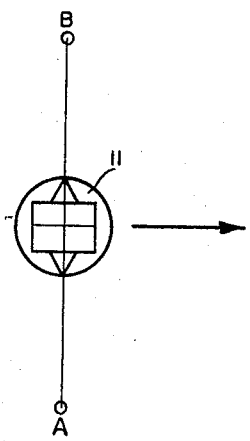
Figure 7:
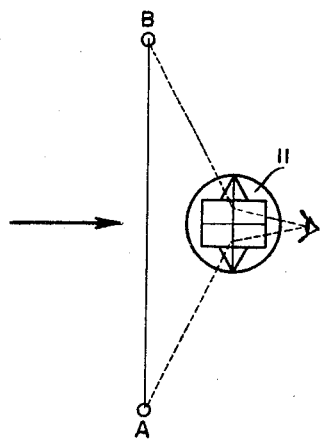

With reference to Figs. 1 and 2, the apparatus comprises a range-mirror unit 11 secured to a pelorus 12 by means of the stud 13 provided thereon and from which the sight vane normally secured thereto, has been removed.

The range-mirror unit 11 consists of the frame 14, having a base portion 15 provided with an aperture 16, vertical side wall 17 and upper platform or upper plate 18 to which range mirrors 19 and 21 are secured by means of brackets 22 and 23 and studs 24 and 25. Although it may be found to be convenient to vary the apex angle between the mirrors, in the preferred embodiment herein disclosed the mirrors 19 and 21 are inclined to each other at an angle of 93° so that rays of light from diametrically opposite points, on or near the horizon, which strike the reflecting surfaces at 90° to the mirror vertex will converge approximately nine inches above the vertex. Also, secured to the platform 18 by bracket 26 and studs 27 is a spirit-level 28 which extends across the unit in a direction at right angles to the mirrors 19 and 21. The frontal surface 29 of each of the mirrors is aluminized so that a high degree of reflectivity is attained. To aid in centering the mirrors on assembly and also to furnish a continuation of the lines 32 inscribed on the double pointers 33 secured to the frame 14, a hair line 31 is inscribed on the surface of each of the mirrors. A marking 31a is provided on each of the mirrors 19 and 21 at equal distances from the apex.

The device herein described is operated essentially in the following manner: The range mirror unit 11 is loosely secured to pelorus 12 so that the double pointers 33 and the mirror assembly may easily be rotated about stud 13 as desired. From navigational charts, true bearings of center ranges available in a given harbor or channel may be readily ascertained. It will be assumed, for example, that a range to be crossed has a true bearing of 095° and the variation for the area is 2° east. Taking these two factors into account, the pointers 33 of the range-mirror unit are swung to an angle of 093°, which is a magnetic bearing of the range, and tightened securely to the card 30 of the pelorus so that the card and range mirror combination rotate as a unit. In making use of this device, a person will be stationed at the pelorus, range-mirror unit to instruct the helmsman to take readings on the magnetic compass being checked. The operator of the pelorus range-mirror combination will note in the mirrors when the on-range position is attained, a condition which exists when the eye of the operator is directly above the mirrors, the combination having been rotated if necessary to make certain that the markings on the pointers and the mirrors will be parallel to the range and coinciding therewith, and the objects defining the range appearing to be equidistant from the markings 31a when the point of crossing is reached. At the time the on-range position is attained, the helmsman will be instructed to take a reading from the magnetic compass simultaneously with that made on the pelorus, the instrument being kept level by use of the spirit-level 28. Thus, when the vessel is on the center range the monuments A and B defining the range will appear on base-lines 31 and the operator's eye will be directly over the apex of the lines 31. At this instant the alignment of the pelorus card is such that the 360° marking thereon points magnetic north and the forward lubber line gives the magnetic heading of the vessel. The difference in readings taken by the pelorus and that taken by the magnetic compass is the deviation for the particular heading. Thus, if the ship's heading by pelorus card and magnetic compass are 045° and 041° respectively, the deviation of the magnetic compass for this set of conditions is 4° east. If it is desirable to check a reading or to ascertain the deviation present after a compensation adjustment of the compass has been made, it is merely necessary to ascertain the bearing of the next succeeding range, to set the pelorus range-mirror combination in accordance therewith and to proceed as before.

If the error of a gyroscopic compass is to be checked, which error will be constant regardless of the ship's heading, it is merely necessary to set the pelorus range-mirror combination on the true bearing of a range, ascertain the true heading thereby and compare the reading with that taken simultaneously on the gyro compass, the proper sign east or west being applied to the error.

It will be understood that the above description and accompanying drawings comprehend only the general and preferred embodiment of the invention and that various changes in construction, proportion and arrangement of the parts may be made within the scope of the appended claims without sacrificing any of the advantages of the invention.

The invention described herein may be manufactured and used by or for the Government of the United States of America for governmental purposes without the payment of any royalties thereon or therefor.

I claim:

1. Apparatus for determining the error of a compass by comparison of the compass reading with respect to the true bearing of two diametrically opposed monuments positioned on a known center range line as the compass moves across said line comprising a fixed annular ring provided with a mark to indicate the direction of movement, a vertical spindle positioned at the center of said ring, a frame provided with a base rotatably mounted on said spindle, a compass rose rotatably centered on said spindle below said frame and within said ring, locking means for clamping the frame and compass rose together, a pair of diametrically opposed pointers rigidly attached to the base plate of the frame at right angles to the axis of the spindle and adapted to read on the compass rose, longitudinal center lines inscribed on said pointers lying in the vertical plane passing through the axis of the spindle, a top plate firmly attached to said frame at right angles to the axis of said spindle, a pair of reflecting elements mounted on said top plate with the reflecting surfaces vertically inclined to each other at an interior angle of approximately 93°, symmetrically disposed with reference to a plane which is normal to the inscribed center lines on the pointers and adapted to simultaneously reflect the images of the monuments to a point exterior to and above said reflecting elements, transverse center lines and center points inscribed on said reflecting elements at the intersection of the vertical plane through the center lines on the pointers with the reflecting surfaces of the reflecting elements and means mounted on said top plate to indicate when said pointers are level, the apparatus adapted, when the pointers are level and reading the known bearing of the center range line on the compass rose and the images of the monuments are on the inscribed lines of the mirrors, to indicate the true compass bearing for the direction of movement of the observer as said center range line is approached, crossed and departed from.

2. Apparatus for determining the error of a compass by comparison of the compass reading with respect to the true bearing of two diametrically opposed monuments positioned on a known center range line as the compass moves across said line comprising a fixed reference point positioned to indicate the direction of movement of the observer, a vertical spindle mounted near said reference point, a frame provided with a baseplate rotatably mounted on said spindle, a compass rose rotatably centered on said spindle below said frame and adapted to register with said fixed reference point, locking means for clamping the frame and compass rose together, a pair of diametrically opposed pointers rigidly attached to the base of the frame at right angles to the axis of the spindle and adapted to read on the compass rose, reference marks centrally inscribed on the pointers near the inner ends thereof, a top plate firmly attached to said frame at right angles to the axis of the spindle, a pair of reflecting elements mounted on said top plate with their reflecting surfaces inclined to each other at an interior angle of approximately ninety three degrees, symmetrically disposed with reference to a plane which is normal to the center line of the pointers and adapted to simultaneously reflect the images of the monuments to a point exterior to and above said reflecting elements, transverse center lines and center points inscribed on said reflecting elements, extending to the lower edges of the reflecting elements, and optically forming a continuous straight line coinciding with a line through the reference marks on the pointers when viewed from directly above and means mounted on said top plate to indicate when said pointers are level, the said reference point adapted when the pointers are level and reading the known bearing of the center range line on the compass rose and the images of the monuments are on the inscribed lines of the mirrors, to indicate the true compass bearing for the direction of movement of the observer as said center range line is approached, crossed and departed from.

3. Apparatus for determining the error of a compass by comparison of the compass reading with respect to the true bearing of two diametrically opposed monuments positioned on a known center range line as the compass moves across said line comprising a fixed annular ring provided with a mark to indicate the direction of movement, a vertical spindle positioned at the center of said ring, a frame provided with a base plate rotatably mounted on said spindle, a compass rose rotatably centered on said spindle below said frame and within said ring, locking means for clamping the frame and compass rose together, a pair of diametrically opposed pointers rigidly attached to the base plate of the frame at right angles to the axis of the spindle and adapted to read on the compass rose, longitudinal center lines inscribed on said pointers lying in the vertical plane passing through the axis of the spindle, a top plate firmly attached to said frame at right angles to the axis of said spindle, a pair of reflecting elements mounted on said top plate with the reflecting surfaces vertically inclined to each other at an interior angle of the order of 93°, symmetrically disposed with reference to a plane which is normal to the inscribed center lines on the pointers and adapted to simultaneously reflect the images of the monuments to a point exterior to and above said reflecting elements, transverse lines inscribed on said reflecting elements at the intersection of the vertical plane through the center lines on the pointers with the reflecting surfaces of the reflecting elements and means mounted on said top plate to indicate when said pointers are level, the apparatus adapted, when the pointers are level and reading the known bearing of the center range line on the compass rose and the images of the monuments are on the inscribed lines of the mirrors, to indicate the true compass bearing for the direction of movement of the observer as said center range line is approached, crossed and departed from.

JOHN W. SAWYER.

REFERENCES CITED

The following references are of record in the file of this patent:

UNITED STATES PATENTS

| Number | Name | Date |
|---|---|---|
| 629,757 | Christiansen | July 25, 1899 |
| 688,826 | Clark | Dec. 17, 1901 |
| 1,788,830 | Grone | Jan. 13, 1931 |

FOREIGN PATENTS

| Number | Country | Date |
|---|---|---|
| 10,970 | Great Britain | 1915 |
| 278,465 | Germany | Sept. 29, 1914 |